United States Patent [19]

Richter

[11] Patent Number: 4,669,834
[45] Date of Patent: Jun. 2, 1987

[54] LIGHT REFLECTIVE CONTACT LENS

[76] Inventor: Judy C. Richter, 165 Avenue A, New York, N.Y. 10009

[21] Appl. No.: 729,154

[22] Filed: Apr. 30, 1985

[51] Int. Cl.[4] .......................... G02C 7/04; G02C 7/10; G02C 7/14
[52] U.S. Cl. .................................. 351/162; 351/160 R
[58] Field of Search ............... 351/160 H, 160 R, 161, 351/162

[56] References Cited

U.S. PATENT DOCUMENTS

| | | | |
|---|---|---|---|
| 2,524,811 | 10/1950 | Koberlein | 351/162 |
| 3,679,504 | 7/1972 | Wichterle | 351/162 |
| 3,712,718 | 1/1973 | LeGrand et al. | 351/162 X |
| 3,962,505 | 6/1976 | Avery | 351/160 |
| 4,157,892 | 6/1979 | Tanaka et al. | 351/162 |
| 4,252,421 | 2/1981 | Foley | 351/162 |
| 4,355,513 | 10/1982 | January | 351/160 |
| 4,460,523 | 7/1984 | Neefe | 351/162 |
| 4,468,229 | 8/1984 | Su | 351/162 |

FOREIGN PATENT DOCUMENTS

| | | | |
|---|---|---|---|
| 2132309 | 1/1972 | Fed. Rep. of Germany | 351/160 R |
| 60442 | 2/1968 | German Democratic Rep. | 351/160 R |

OTHER PUBLICATIONS

Mandell, Contact Lens Practice, 376-381, (2d ed., 1974).

Primary Examiner—John K. Corbin
Assistant Examiner—Scott J. Sugarman
Attorney, Agent, or Firm—Hopgood, Calimafde, Kalil, Blaustein & Judlowe

[57] ABSTRACT

A contact lens which is light reflective, as opposed to transparently tinted. This type of contact lens is useful for cosmetic purposes and for decreasing the amount of glare, bright light, ultraviolet light and infrared light that could enter the eye. In a preferred embodiment, the lens is of a silvered or mirrored appearance.

9 Claims, 7 Drawing Figures

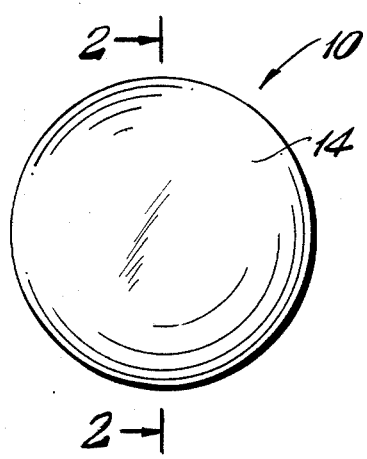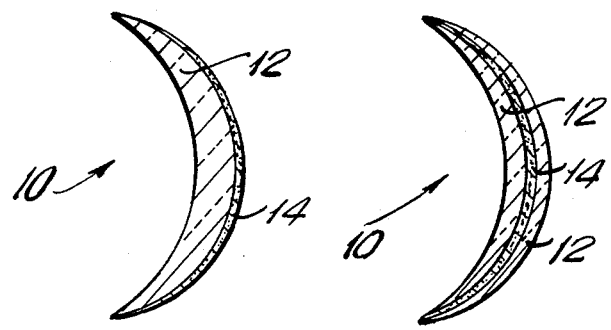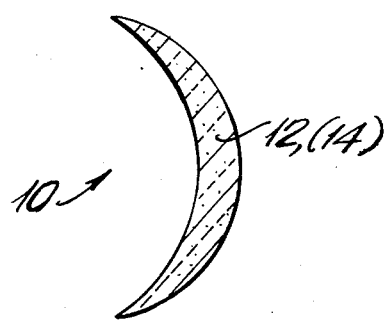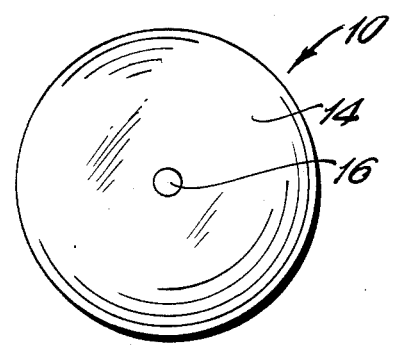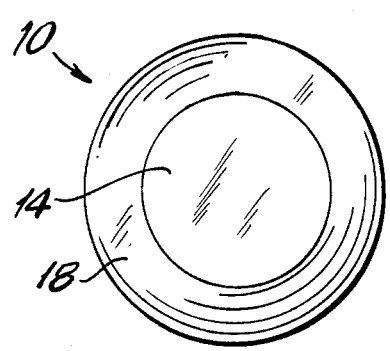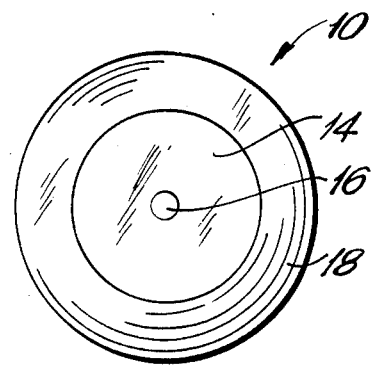

LIGHT REFLECTIVE CONTACT LENS

BACKGROUND AND SUMMARY OF THE INVENTION

This invention relates generally to contact lenses and more specifically to a contact lens which is light reflective, so that the iris is not visible through the lens. In a preferred embodiment, the lens is of a mirrored or silvery appearance. In an alternate embodiment, the lens will reduce the glare, ultraviolet and infrared light which enters the eye. This invention can be used by persons who both do and do not wear contact lenses to correct vision.

Contact lenses are known in the art. Hard contact lenses were first produced in 1948, and the lens material is polymethyl methacrylate, a hard plastic. While these lenses are effective, they are hard to fit, irritating to the eye, and can only be worn for a limited number of hours.

Soft contact lenses were first marketed in the United States in 1971. They consist of a polymeric lens material which is both hydrophylic and oxygen permeable. Because of these properties, soft contact lenses are easier to fit, more comfortable, and can be worn on a more irregular basis as compared to hard contact lenses. Furthermore, improvements in contact lens technology now allows for gas permeable and extended wear lenses. Hard lenses are still used, however, because they have a stronger corrective ability, are less expensive, and are less prone to damage.

Contact lenses have enjoyed enormous economic success. The current wearer population is estimated at 14 million, with another 40 to 50 million candidates. By 1990, there are expected to be between 45 to 90 million contact lens wearers, with annual sales of contacts in excess of one billion dollars.

Recently, several manufacturers have begun marketing tinted contact lenses. The contact lenses are tinted by using numerous techniques known in the art, see, e.g., U.S. Pat. Nos. 4,468,229; 4,460,523; 4,355,135; 4,252,421; 4,157,892; 3,962,505; 3,679,504 and 2,524,811; all of which are incorporated here by reference. The lenses are colored in natural shades of blue, green, light brown and violet, and one type of lens is tinted either to cover the iris and the pupil or only the iris. The tinting of the lenses is for cosmetic reasons or for convenience, i.e., it is easier to find a colored lens if it is dropped. However, only a tinting, i.e., translucent coloring is used, and the wearer's iris is visible through the lens.

A new market has recently emerged for tinted plano contact lenses. A plano contact lens is a contact lens which is not designed to correct eyesight. The use of this type of lens is purely cosmetic. A person with blue eyes who wishes to have brown eyes merely has to wear brown tinted plano contact lenses. Again, however, only a tinting is used, and the iris is visible through the lens.

A major problem with tinted lenses now on the market is that they do not filter out bright light, glare, infrared light or ultraviolet light. As described above, these lenses are tinted for cosmetic or convenience purposes only. Therefore, a light sensitive person or a person in bright light, such as sunlight, must wear sunglasses. This defeats the purpose of wearing contact lenses, since they are designed to eliminate the necessity of using any type of eyeglasses in the first instance.

A second major problem with tinted lenses is that the wearer's iris is still visible through the lens. This also limits the cosmetic applications of the lens.

A third major problem is that the lenses are tinted only. They do not incorporate a light reflective substance additive, either to filter out bright light, such as sunlight, or for cosmetic purposes, wherein the wearer's iris is not visible through the lens.

OBJECTS OF THE INVENTION

Accordingly, it is an object of this invention to produce a contact lens which is light reflective, so that a wearer's iris is not visible through the lens.

It is a further object of this invention to produce a contact lens which is of a mirrored or silvered appearance.

It is another object of this invention to produce a type of contact lens which will filter out bright light, glare, ultraviolet light and infrared light.

It is a still further object of this invention to produce a type of contact lens which will eliminate the need for sunglasses.

Still other objects and advantages will become readily apparent from the following description, drawings and claims.

BRIEF DESCRIPTION OF THE DRAWINGS

The invention is described in detail below with reference to the drawings wherein like numerals designate similar points throughtout the various views:

FIG. 1 is a front elevation view of a contact lens constructed in accordance with the invention;

FIG. 2 is a sectional view taken along lines 2—2 of FIG. 1 showing a reflective material incorporated onto the inventive contact lens;

FIG. 3 is a sectional view along lines 2—2 of FIG. 1 showing an alternate means of incorporating a reflective material into the lens;

FIG. 4 is a sectional view taken along lines 2—2 of FIG. 1 showing a second alternate means of incorporating a reflective material into the lens;

FIG. 5 is a front elevation view of a second construction of the invention;

FIG. 6 is a front elevation view of a third construction of the invention; and

FIG. 7 is a front elevation view of a fourth construction of the invention.

DETAILED DESCRIPTION OF THE INVENTION

In accordance with the present invention, there is provided a novel contact lens which is made to actually reflect light, as opposed to the prior art wherein the lens is merely tinted for cosmetic or convenience purposes.

Materials which reflect light are per se known in the prior art. Such reflective material additives which can be enhanced in the present invention include metal particles, such as gold, platinum, stainless steel, silver, nickel, chrome, aluminum, and nickel alloys; other particulate matter, including ground oyster shells and mica; materials which will polarize light and, in a preferred embodiment, materials which will give the lens a silvered or mirrored appearance. These materials are set forth here for example only, and are in no way intended to be limiting of the scope of the invention.

Lenses incorporating these materials will be effective in decreasing glare and the amount of bright, ultraviolet and infrared light that enters the eye. Accordingly, they are an effective replacement for sunglasses.

The contact lens is constructed of conventional materials. These materials include polymethyl methacrylate (PMMA) used in hard contact lenses; hydroxyethyl-methyl-methacrylate and other related polymers such as 2-hydroxyethyl-methacrylate, N-[1,1-Dimethyl-3-oxobertyl]-Acrylamide and methacrylic acid, used in soft contact lenses; cellulose acetate bertryate, silicone and silicone combined with PMMA, used in gas permeable contact lenses; and perfilcon A and polymer bufilcon A, used in extended wear contact lenses. Other materials are equally applicable to the instant invention.

In a contact lens 10, a reflective material 14 can be supported by a lens material 12 via a variety of techniques. For example FIG. 2, the reflective material 14 is incorporated onto the surface of the lens material 12 of the contact lens 10. This can be accomplished by total immersion, vapor deposition or gas chromatography. Alternatively, an aqueous dispersion of reflective material 14 can be dissolved in a plasticizer, with the final product then being applied to the surface of the lens material 12. The reflective material 14 can be embedded into a transparent matrix, with the matrix being applied to the surface of the lens material 12. The reflective material 14 can also be incorporated onto the surface of the lens material 12 by using a coating composition based on siloxane/silver hybrid coating resins. Another technique would be to covalently bond the reflective material 14 to the lens material 12. Another technique would be glow discharge deposition.

An alternative technique for incorporating the reflective material 14 into or onto the contact lens 10 FIG. 3 is to incorporate the reflective material 14 between two layers of lens material 12, 12. For soft contact lenses, the two layers of lens material 12, 12 are bound together by polymerizing between them a monomer mixture forming the same or a similar hydrogel.

A third technique FIG. 4 is to actually incorporate the reflective material 14 into the lens material 12. This can be accomplished by embedding the reflective material 14 into the lens material 12 or by immersing into an aqueous solution containing the reflective material 14 a copolymer of a coupler monomer and a water absorbable plastic monomer or a polymer of a coupler monomer and a water absorbable plastic monomer, either one formed in the shape of the final product.

The contact lens 10 can have several different appearances. For example FIG. 1, the entire contact lens 10 can be light reflecting. Here, the reflective material 14 is incorporated into or onto the entire contact lens 10. Alternatively FIG. 5, a central portion 16 of the contact lens 10 can either be of a dark reflective material or be left clear. This would give the lens a more natural appearance since it would resemble the pupil of the eye.

Some contact lenses are of a larger size than the iris of the eye. Accordingly FIG. 6, the reflective material 14 may be incorporated into or onto only that portion of the contact lens 10 which covers the iris and pupil. A sclera-covering portion 18 of the contact lens 10 is left transparent in order to produce a more natural appearance. In another embodiment FIG. 7, a central portion 16 of the contact lens 10 is of a dark reflective material or is left transparent in order to resemble a pupil. This would produce an even more natural appearance.

This invention has many practical advantages, both for those who do and do not wear contact lenses to correct vision. For example, some people who use hard contact lenses become light sensitive. If they are exposed to bright light, they must use sunglasses. This defeats the purpose of wearing contact lenses, since their function is to eliminate the need for any type of eyeglasses. By using the instant invention, sunglasses are unnecessary. Other persons who are light sensitive will derive the same benefit.

The uses of this invention are not only limited to those persons who wear contact lenses to correct vision. For example, many sunbathers endeavor to get an even tan, including the facial area. If they wear sunglasses, part of the face is blocked from the sun and will not tan. The alternative is to not wear sunglasses, thus exposing the eyes to harmful ultraviolet light which is associated with early and more common cataract formation, and infrared light. This invention avoids both problems, since sunglasses are unnecessary and the eyes are protected. The advantages of this invention will be readily appreciated by sunbathers, sailors and skiers, to name a few.

In order to be an effective replacement for sunglasses, these lenses will reflect an amount of light sufficient to avoid the above-mentioned problems. Accordingly, these lenses will transmit only between 15 to 35% of the light impinging on them. This transmission level is considered to be the safe range for sunglasses in order for them to be effective. It is important to re-emphasize that this is a property which conventional lenses simply do not have.

A further use for this invention is cosmetic in nature. As an example, the contact lenses are silvered or mirrored, creating a striking appearance which many will find aesthetically pleasing.

Occasionally, especially when the light reflective material is bright or shiny, light may be reflected back into the eye causing comfort. To overcome this problem, the lens material may be of a dark material or may be smoked or tinted.

The above examples and uses are set forth for illustration only, without in any way limiting the scope of the instant invention.

I claim:

1. A contact lens which comprises a lens material supporting in its central region a light reflective material defining a light reflective area for covering the iris of a wearer, said light reflective area being of equal diameter with the size of an iris and including an outer portion of light reflective material surrounding an inner portion of a light reflective material, said inner portion of light reflective material being darker in appearance than said outer portion of light reflective material.

2. A contact lens which comprises:

a. a lens material; and b. a first light reflective material supported by at least a portion of said lens material so that a wearer's iris is not visible through the lens;

said first light reflective material having an inside diameter equal to a pupil and an outside diameter equal to the diameter of said contact lens; and wherein the portion of the lens material which lies within the inside diameter of said first light reflective material supports a second light reflective material which is darker in appearance than said first light reflective material.

3. The contact lens as recited in claim 2 which will filter out glare, ultraviolet light and infrared light.

4. The contact lens as recited in claim 3 which will transmit between 15 and 35 percent of the light impinging on it.

5. The contact lens as recited in claim 2 wherein one or both of said first and second light reflective materials produce a mirrored reflection.

6. A contact lens which comprises:
a. a lens material; and
b. a first light reflective material supported by at least a portion of said lens material so that a wearer's iris is not visible through the lens;
said first light reflective material having an outside diameter equal to the size of an iris and an inside diameter equal in size to a pupil; and
wherein the portion of the lens material which lies within the inside diameter of said first light reflective material supports a second light reflective material which is darker in appearance than said first light reflective material.

7. The contact lens as recited in claim 6 which will filter out glare, ultraviolet light and infrared light.

8. The contact lens as recited in claim 7 which will transmit between 15 and 35 percent of the light impinging on it.

9. The contact lens as recited in claim 6 wherein one or both of said first and second light reflective materials produce a mirrored reflection.

* * * * *